(12) United States Patent
Machac et al.

(10) Patent No.: US 12,728,490 B2
(45) Date of Patent: Sep. 8, 2026

(54) MATERIAL SUPPORT SYSTEMS, MATERIAL SUPPORT STRUCTURES, AND RELATED METHODS

(71) Applicant: Northrop Grumman Systems Corporation, Falls Church, VA (US)

(72) Inventors: David R. Machac, Ogden, UT (US); Joel L. Robison, Roy, UT (US); Mary A. White, Salt Lake City, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 233 days.

(21) Appl. No.: 18/617,393

(22) Filed: Mar. 26, 2024

(65) Prior Publication Data

US 2025/0303510 A1 Oct. 2, 2025

Related U.S. Application Data

(62) Division of application No. 17/201,302, filed on Mar. 15, 2021, now Pat. No. 11,951,582, which is a division of application No. 16/104,832, filed on Aug. 17, 2018, now Pat. No. 10,946,489.

(51) Int. Cl.
*B23Q 3/08* (2006.01)
*B23Q 3/06* (2006.01)

(52) U.S. Cl.
CPC ............. *B23Q 3/086* (2013.01); *B23Q 3/065* (2013.01)

(58) Field of Classification Search
CPC ................................ B23Q 3/086; B23Q 3/065
See application file for complete search history.

(56) References Cited

U.S. PATENT DOCUMENTS

| | | | |
|---|---|---|---|
| 2,855,664 | A | 10/1958 | Griffith et al. |
| 2,905,064 | A | 9/1959 | Nielsen |
| 2,937,437 | A | 5/1960 | Cole et al. |
| 3,083,002 | A | 3/1963 | Lacey, Jr. |
| 3,176,387 | A | 4/1965 | Argueso et al. |
| 3,413,708 | A | 12/1968 | Norvillie et al. |
| 3,574,257 | A | 4/1971 | Bois et al. |

(Continued)

FOREIGN PATENT DOCUMENTS

| | | |
|---|---|---|
| DE | 2428647 A1 | 1/1975 |
| FR | 2772658 A1 | 6/1999 |

OTHER PUBLICATIONS

Machine Translation of DE 2428647A.*

(Continued)

*Primary Examiner* — Tyrone V Hall, Jr.
(74) *Attorney, Agent, or Firm* — KATTEN MUCHIN ROSENMAN LLP

(57) ABSTRACT

A core support system includes a support structure. The support structure includes a frame and a support member having a saturatable engagement layer disposed over the frame. A method of machining a core material incudes applying a fluid to an engagement layer of a support structure and saturating the engagement layer with the fluid, disposing a core material on the engagement layer, causing the fluid to freeze to secure to the core material to the support structure, machining the core material, melting the frozen fluid to release the core material from the support structure, and removing the core material from the engagement layer.

20 Claims, 6 Drawing Sheets

(56) References Cited

U.S. PATENT DOCUMENTS

| | | | | |
|---|---|---|---|---|
| 4,091,580 | A | 5/1978 | Oates | |
| 4,607,496 | A | 8/1986 | Nagaura | |
| 4,629,378 | A | 12/1986 | Parsons | |
| 4,730,382 | A | 3/1988 | Parsons | |
| 8,844,158 | B2 | 9/2014 | Dehn | |
| 8,935,930 | B2 * | 1/2015 | Cousin | F25D 3/12 62/64 |
| 9,199,349 | B2 | 12/2015 | Carl | |
| 10,946,489 | B2 | 3/2021 | Machac et al. | |
| 2006/0156785 | A1 | 7/2006 | Mankame et al. | |
| 2014/0161553 | A1 * | 6/2014 | Carl | B23Q 3/065 29/559 |
| 2021/0197330 | A1 | 7/2021 | Machac et al. | |

OTHER PUBLICATIONS

Dictionary definition of the term "saturated" from https://www.lexico.com/en/definition/saturated, printed Oct. 29, 2020.

Espacenet. DE2428647 Machine Translation (Year: 2023).

Machine Translation of DE 2428647-A, which DE '647 was published Jan. 1975.

* cited by examiner

MATERIAL SUPPORT SYSTEMS, MATERIAL SUPPORT STRUCTURES, AND RELATED METHODS

CROSS-REFERENCE TO RELATED APPLICATIONS

This application is a divisional of U.S. patent application Ser. No. 17/201,302, filed Mar. 15, 2021, which is a divisional of U.S. patent application Ser. No. 16/104,832, filed Aug. 17, 2018, now U.S. Pat. No. 10,946,489, issued Mar. 16, 2021, the disclosure of each of which is hereby incorporated herein in its entirety by this reference.

TECHNICAL FIELD

Embodiments disclosed herein relate to material support systems and material support structures for supporting and securing materials (e.g., core materials) during machining processes. Furthermore, embodiments disclosed herein relate to methods for securing materials during machining processes.

BACKGROUND

Materials including non-solid cores such as honeycomb cores are often utilized in aerospace applications due to desirable structural characteristics and low weights of the non-solid cores. For instance, honeycomb cores are conventionally utilized in composite structures. "Honeycomb" refers to the columnar and hexagonal (or other shaped) internal structure of the material. Cores are typically made from metals and composites and are generally sandwiched between two skins of a solid material to for a portion of a composite structure. The skins are attached to the core using known fasteners including adhesives, epoxies, weld joints, and braze joints, among others. The resulting structure (in the case of a honeycomb core) approximates a tessellating pattern of hexagonal prisms, where the top and bottom face of each prism is a part of the skin of solid material. As noted above, cores are typically structurally strong and, due to the voids within the core material, lightweight.

Machining of core materials is conventionally difficult using traditional subtractive manufacturing processes (e.g. milling) because it is difficult to properly secure the core materials to a support structure. For instance, core materials are conventionally secured to a surface for machining via pressure sensitive adhesives, thermoplastics, and cure-on products. Each of the foregoing methods present problems in abilities to drape the core material to three dimensional contours, losing adhesion during machining processes, damaging the core material during removal, and leaving residue on and/or contaminating the core materials.

BRIEF SUMMARY

Some embodiments of the present disclosure include a material support system, such as, for example, a core support system. The material support system may include a thermally conductive member defining a support portion for receiving at least one material on the support portion, the support portion comprising an at least partially fluid-saturatable engagement layer disposed over the thermally conductive member, the thermally conductive member configured to remove heat energy from a fluid disposed on or within the at least partially fluid-saturatable engagement layer to reduce the temperature of the fluid to solidify the fluid and secure the at least one material to the support portion of the thermally conductive member.

Embodiments disclosed herein include a material support system, such as, for example, a core support system. The core support system may include an insulating frame defining a recess, a thermally conductive insert disposed within the recess of the insulating frame and including a coil recess in an upper surface of the thermally conductive insert, at least one coil disposed in the coil recess of the thermally conductive insert, and a saturatable engagement layer disposed over the thermally conductive insert.

Additional embodiments of the present disclosure include a method of machining a core material. The method may include applying a fluid to an engagement layer of a support structure and saturating at least a portion the engagement layer with the fluid, disposing a core material on the engagement layer and causing the core material to engage at least a portion of the fluid, at least partially solidifying the fluid to secure to the core material to the support structure, machining the core material, returning the solidified fluid to a fluid state to release the core material from the support structure, and removing the core material from the engagement layer.

Some embodiments of the present disclosure include a core support system. The core support system may include a support structure including an insulating frame at least partially defining one or more compartments, each of the one or more compartments including a spring-loaded plate assembly and a support member disposed over the one or more compartments. The support member may include a support layer and a saturatable engagement layer disposed over the support layer.

One or more embodiments of the present disclosure include a core support system. The core support system may include a support structure comprising an insulating frame defining one or more compartments, each of the one or more compartments including an elongated channel and a support member disposed over the one or more compartments. The support member may include a support layer and a saturatable engagement layer disposed over the support layer.

Further embodiments of the present disclosure include a material support system. The material support system may include a thermally conductive member defining a support portion for receiving at least one material on the support portion, the support portion comprising an at least partially fluid-saturatable engagement surface disposed over the thermally conductive member, and at least one channel defined in the thermally conductive member, the at least one channel configured to hold a freezing substance, the thermally conductive member configured to remove heat energy from the fluid with the freezing substance to reduce the temperature of the fluid received by the at least partially fluid-saturatable engagement surface to solidify the fluid and secure the at least one material to the support portion of the thermally conductive member.

DETAILED DESCRIPTION

Figure 1:
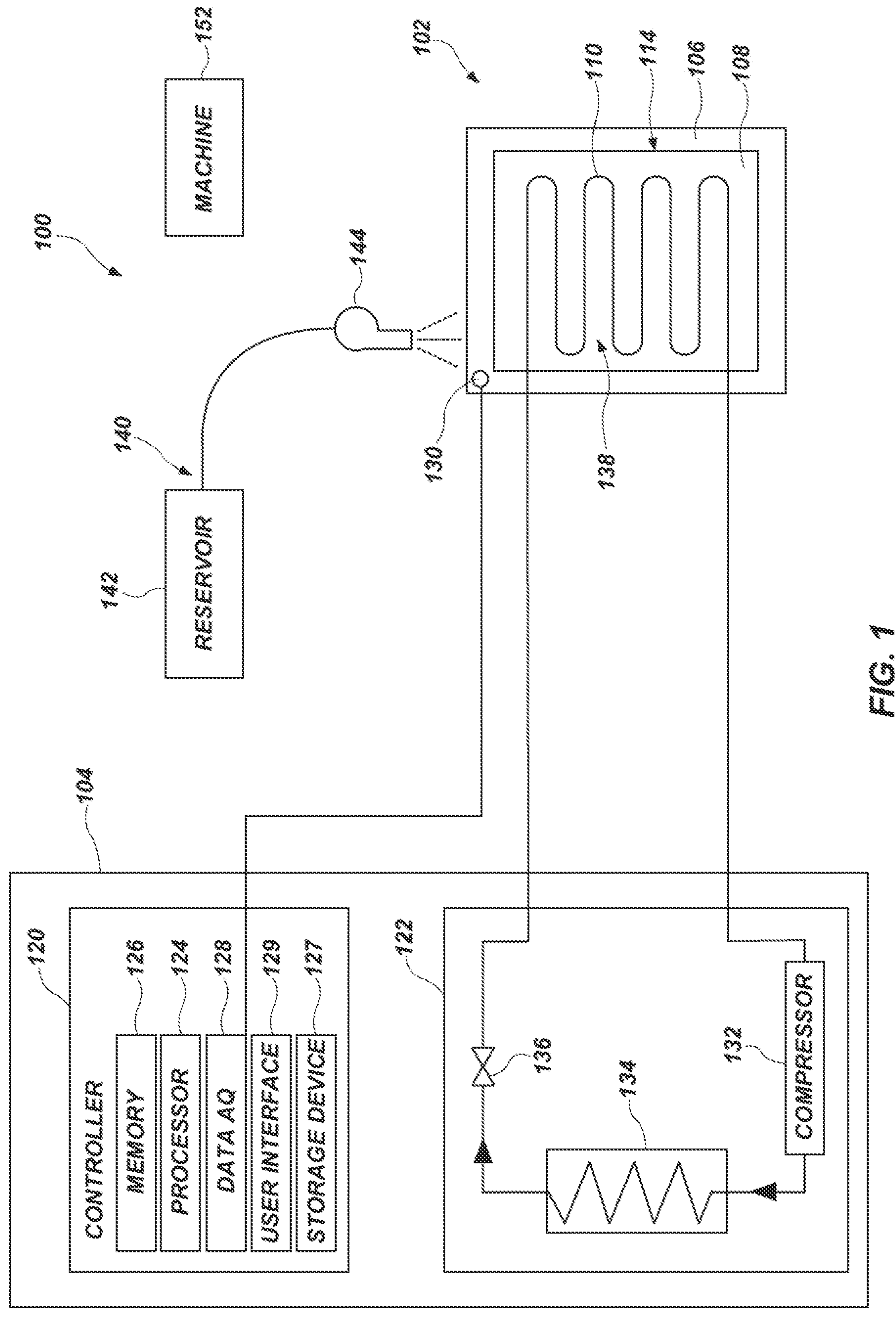
FIG. 1 is a simplified schematic diagram of a core support system according to one or more embodiments of the disclosure.

The illustrations included herewith are not meant to be actual views of any particular core support systems or core support structures but are merely idealized representations that are employed to describe embodiments herein. Elements and features common between figures may retain the same numerical designation except that, for ease of following the description, for the most part, reference numerals begin with the number of the drawing on which the elements are introduced or most fully described.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "lower," "upper," "over," "beneath," "vertical," "horizontal," etc., is used for clarity and convenience in understanding the disclosure and accompanying drawings and does not connote or depend on any specific preference or order, except where the context clearly indicates otherwise. For example, these terms may refer to orientations of elements of core support assemblies and core support structures in conventional orientations. Furthermore, these terms may refer to orientations of elements of core support assemblies and core support structures as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "core material" may refer to any materials utilized with composite laminates to form composite structures. For instance, core materials may include honeycomb core materials, x-cores, end-grain balsa wood, PVC foam, urethane foam, and/or non-woven core fabrics. The honeycomb core materials may include glass-reinforced plastic (i.e., fiberglass) materials, carbon fiber reinforced plastic materials, NOMEX aramide paper reinforced plastic materials, thermoplastic materials, ceramic materials, and/or metal and/or metal alloy materials (e.g., aluminum, steel, carbon, titanium, etc.).

Although embodiments of the present disclosure are generally directed at core materials, in other instances, any other suitable materials may be utilized on the system, devices, and structures disclosed herein.

Some embodiments of the present disclosure include a core support system for supporting a core material during machining processes (e.g., computer numerical control ("CNC") machining processes). In some embodiments, the core support system includes a core support structure and a control and cooling (e.g., refrigeration) system. The core support structure may include an insulating frame, a thermally conductive insert, one or more coils, and an engagement layer. The thermally conductive insert may be disposed within a portion of the insulating frame, and the one or more coils may extend through the thermally conductive insert. The engagement layer may be disposed over the thermally conductive insert, and the engagement layer may include an at least partially fluid-saturatable material. For instance, the engagement layer may include a fiberglass woven material (e.g., a fiberglass mat or plate), or a foam material, such as an open cell foam material. The core support system may further include a fluid application system for applying a fluid to saturate the engagement layer of the support structure.

One or more embodiments of the present disclosure include a method of securing a core material to a support structure for machining the core material. The method may include saturating at least a portion of the engagement layer with a fluid and forming a film of the fluid on and/or within the engagement layer. In some embodiments, the fluid may include water. Upon saturating the engagement layer of the support structure with the fluid, a core material may be placed on the engagement layer and at least engaged with the film of fluid. The core material may be partially submerged in the fluid film. After placing the core material on the engagement layer and engaging the core material with the film of fluid, the fluid may be frozen. For instance, the control and cooling system may pass refrigerant through the coils of the support structure to drop the temperature of the fluid to below the fluid's freezing point. Freezing the fluid may secure the core material to the engagement layer and the support structure. Upon freezing the fluid, the core material may be machined via any conventional machining processes.

Additional embodiments of the present disclosure include an additional core support system for supporting a core material during machining processes. The core support system may include a support structure. The support structure may include an insulating frame at least partially defining one or more compartments and a support member. The support member may be disposed over the one or more compartments. For instance, the support member may form an upper wall of the one or more compartments. The support member may include a support layer (e.g., a support plate)

and an engagement layer disposed over the support layer. Each compartment of the one or more compartments may include a spring-loaded plate assembly configured to press a freezing substance against a lower surface of the support member. For example, a freezing substance (e.g., frozen carbon dioxide (i.e., dry ice)) may be disposed in the one or more compartments, and the spring-loaded plate assembly may press the freezing substance up against the lower surface of the support layer. Pressing the freezing substance against the lower surface of the support layer may cause a fluid disposed on and/or in the engagement layer to freeze, and accordingly, a core material may be secured to the support structure via any of the manners described above.

FIG. 1 shows schematic representation of a core support system 100 utilized for machining core materials according to one or more embodiments of the present disclosure. For instance, the core support system 100 may be utilized for machining core materials with a computer numerical control ("CNC") machine 152 (e.g., a CNC milling machine). The core support system 100 may include a core support structure 102 (referred to hereafter as a "support structure") and a control and cooling system 104 operably coupled to the support structure 102.

Figure 2:
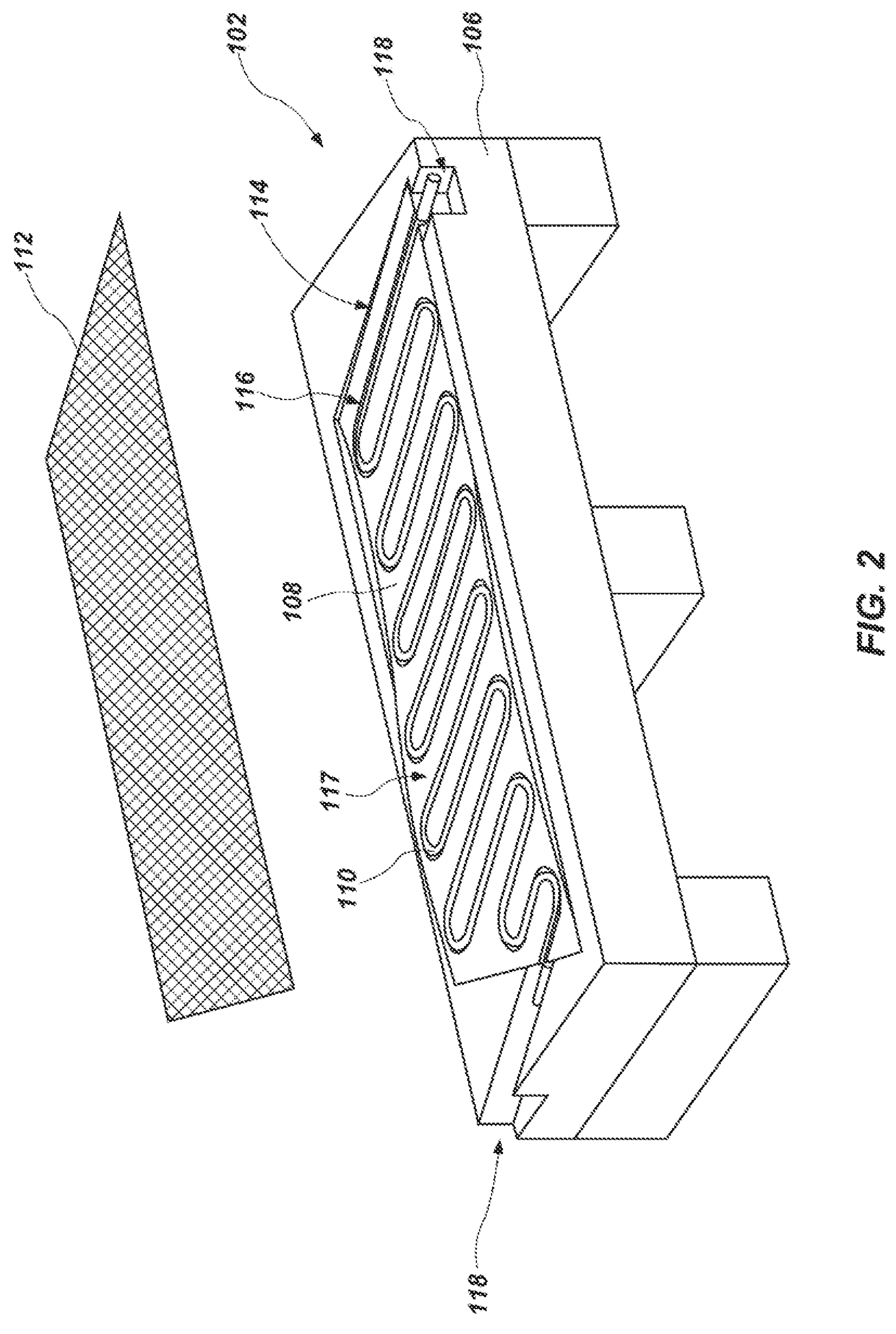
FIG. 2 is a perspective view of a core support structure of a core support system according to one or more embodiments of the present disclosure.

FIG. 2 is a perspective view of a support structure 102 according to one or more embodiments of the present disclosure. Referring to FIGS. 1 and 2 together, the support structure 102 may include an insulating frame 106, one or more thermally conductive inserts 108, one or more coils 110, and an engagement layer 112. In FIG. 2, the engagement layer 112 is shown separated from a remainder of the support structure 102 to better show an internal structure of the support structure 102. The insulating frame 106 may define one or more recesses 114 in an upper surface thereof. The one or more recesses 114 may be sized and shaped to receive the one or more thermally conductive inserts 108. Additionally, the one or more thermally conductive inserts 108 may define one or more coil recesses 116 in an upper surface 117 thereof. The one or more coil recesses 116 may be sized and shaped to receive the one or more coils 110. To facilitate a clearer description of the core support system 100, the one or more thermally conductive inserts 108, the one or more coils 110, the one or more recesses 114, the one or more coil recesses 116, etc., may be referred to in their singular form (e.g., as an "thermally conductive insert" and a "coil"). In some embodiments, the insulating frame 106 may include one or more access apertures 118 through which the one or more coils 110 may enter and exit the insulating frame 106.

In some embodiments, the coil recess 116 for receiving the coils 110 may extend in an undulating manner back and forth within the thermally conductive insert 108. For instance, the coil recess 116 may extend through the thermally conductive insert 108 in a sinusoidal pattern to increase (e.g., maximize) a coil length of the coils 110 within the thermally conductive insert 108. As will be appreciated by one of ordinary skill in the art, the coils 110 may have a structure correlating to the structure of the coil recess 116 such that the coils 110 may be inserted into the coil recess 116. In one or more embodiments, the coil recess 116 may generally extend within a plane parallel to an upper surface of the thermally conductive insert 108. In some embodiments, the coil recess 116 may be open to the upper surface 117 of the thermally conductive insert 108. In alternative embodiments, the coil recess 116 may be closed to the upper surface 117 of the thermally conductive insert 108. For instance, the coil recess 116 may include an aperture extending through the thermally conductive insert 108, and any coils 110 disposed within the coil recess 116 may be at least substantially surrounded by the thermally conductive insert 108. Furthermore, although the coil recess 116 and coils 110 are described as having an undulating shape, the disclosure is not so limited, and the coil recess 116 and coils 110 may have any shape of coils conventionally utilized in cooling (e.g., refrigeration) processes (e.g., a helical shape).

Furthermore, in one or more embodiments, the thermally conductive insert 108 may include integral channels and/or apertures (e.g., tunnels) formed in the thermally conductive insert 108, and the support structure 102 may not include coils 110. For example, any refrigerants of freezing substances typically passed through coils (discussed below) for cooling purposes may be passed directly through the integral channels and/or apertures of the thermally conductive insert 108 thus eliminating any need for coils. Forming integral channels and/or apertures directly in the thermally conductive insert 108 and not utilizing coils may enable relatively complex patterns of refrigerant fluid pathways not otherwise achievable with coils. For instance, the thermally conductive insert 108 may include concentrated refrigerant fluid pathways at particular locations within the thermally conductive insert 108 correlating to areas of a core material (to be placed on the thermally conductive insert) where high stresses are expected during a machining process. Increasing a concentration of refrigerant fluid pathways within the thermally conductive insert 108 at areas of expected relatively high stresses may reduce and/or prevent movement of correlating portions of the core material during machining processes.

In some embodiments, the upper surface 117 of the thermally conductive insert 108 may be at least substantially planar. In additional embodiments, the upper surface 117 may be nonplanar. For instance, the upper surface 117 may include on or more raised and/or recessed portions relative to other portions of the upper surface 117. Additionally, the upper surface 117 may have one or more arcuate (e.g., curved) portions. As an additional non-limiting example, the upper surface 117 may include a planar portion and a non-planar portion. As will be appreciated by one of ordinary skill in the art, the upper surface 117 of the thermally conductive insert 108 may include any three-dimensional surface. As is discussed in greater detail below, in some instances, the upper surface 117 of the thermally conductive insert 108 may be sized and shaped to match and/or define a contour of a side of a core material to be machined on the support structure 102.

In one or more embodiments, the thermally conductive insert 108 may include a thermally conductive metal or metal alloy. For instance, the thermally conductive insert 108 may include one or more of aluminum, copper, brass, stainless steel, bronze, etc. In additional embodiments, the thermally conductive insert 108 may include thermally conductive plastics. For example, the thermally conductive insert 108 may include thermally conductive 3-D printed plastics. In yet additional embodiments, the thermally conductive insert 108 may include combinations of the above and/or other types of material, such as, for example, composite materials. Furthermore, the thermally conductive insert 108 may serve to spread cooling effects (e.g., cooling effects created by the coils 110 (as discussed in greater detail below) via evaporation of a refrigeration cycle) throughout the thermally conductive insert 108 and throughout the engagement layer 112 and toward any core materials disposed on the engagement layer 112.

In one or more embodiments, the insulating frame 106 may include a foam material. For example, the insulating frame 106 may include a polyurethane foam and/or a polystyrene foam. Additionally, the insulating frame 106 may include one or more of ceramics, fiberglass, cellulose, and/or mineral wool. Moreover, the insulating frame 106 may include any material conventionally utilized for insulation. Furthermore, the insulating frame 106 may substantially prevent and/or reduce heat transfer into the thermally conductive insert 108 from an external environment. For instance, the insulating frame 106 may assist in keeping the thermally conductive insert 108 at relatively low temperatures.

The engagement layer 112 of the support structure 102 may be disposed over the upper surface 117 of the thermally conductive insert 108. As noted above, the engagement layer 112 is depicted separate from the remainder of the support structure 102 in FIG. 2 to better show the internal structure of the support structure 102; however, it is understood that the engagement layer 112 is disposable over the thermally conductive insert 108 and the insulating frame 106. As is discussed in greater detail below, the engagement layer 112 may serve to secure a core material to the support structure 102.

In some embodiments, the engagement layer 112 may include a flexible material. For instance, the engagement layer 112 may include a flexible material that is drapable over and/or moldable against contours of the thermally conductive insert 108. In one or more embodiments, the engagement layer 112 may include a porous and/or mesh material. In additional embodiments, the engagement layer 112 may include one or more of a non-woven scrim, a felt material, or a woven material of nylon, polyester, etc. Furthermore, in some embodiments, the engagement layer 112 may be at least partially saturatable. In other words, at least a portion of the engagement layer 112 may be capable of being saturated with a fluid and/or holding at least some amount of a fluid. For example, the engagement layer 112 may include a fiberglass material. For instance, the engagement layer 112 may include a fiberglass fabric. In additional embodiments, the engagement layer 112 may include a foam material. Such embodiments are particularly suitable for applications where the adjacent surface topography of the thermally conductive insert 108 is nonplanar, so that fluid is held by the engagement layer 112 at least on the surface thereof, or even over the surface due to surface tension, for substantially continuous contact with a core material draped over the surface. In other embodiments, for example where a surface of the thermally conductive insert is substantially planar and horizontal, the engagement layer 112 may be at least substantially solid and may not be flexible and/or porous.

In one or more embodiments, the engagement layer 112 may have a thickness within a range of about 0.002 inch (2 mils) and about 0.150 inch (150 mils). For instance, in some embodiments, the engagement layer 112 may have a thickness within a range of about 0.002 inch (2 mils) and about 0.010 inch (10 mils). As a non-limiting example, the engagement layer 112 may have a thickness within a range of about 0.002 inch (2 mils) and about 0.003 inch (3 mils). For example, the engagement layer 112 may have a thickness of about 0.0022 inch (2.2. mils).

In some embodiments, the engagement layer 112 may be secured to the upper surface 117 of the thermally conductive insert 108 and/or the insulating frame 106 of the support structure 102. For instance, the engagement layer 112 may be secured to the upper surface 117 of the thermally conductive insert 108 and/or the insulating frame 106 of the support structure 102 via an adhesive. In alternative embodiments, the engagement layer 112 may be loosely disposed over the thermally conductive insert 108 and insulating frame 106 of the support structure 102. Furthermore, in such embodiments, as is described in greater detail below, the engagement layer 112 may be secured to the thermally conductive insert 108 and/or the insulating frame 106 by freezing a fluid held within the engagement layer 112. Accordingly, the engagement layer 112 may be removable from the thermally conductive insert 108 and insulating frame 106 and may be exchangeable with other engagement layers.

Referring still to FIGS. 1 and 2, in some embodiments, the control and cooling (e.g., refrigeration) system 104 may include a controller 120 and a cooling (e.g., refrigeration) system 122. Furthermore, although the controller 120 and the cooling system 122 are shown as being included within a single unit, the disclosure is not so limited. Rather, in some embodiments, the controller 120 and cooling system 122 may be separate and distinct from each other. However, the cooling system 122 may be operably connected to the controller 120 such that the controller 120 may control the operation of the cooling system 122.

The controller 120 may include a processor 124, a memory 126, a storage device 127, a data acquisition system 128, a user interface 129, and one or more temperature sensors 130. The processor 124 may include a microprocessor, a field-programmable gate array, and/or other suitable logic devices. In one or more embodiments, the processor 124 includes hardware for executing instructions, such as those making up a computer program. As an example and not by way of limitation, to execute instructions, the processor 124 may retrieve (or fetch) the instructions from an internal register, an internal cache, the memory 126, or the storage device 127 and decode and execute them. In one or more embodiments, the processor 124 may include one or more internal caches for data, instructions, or addresses. As an example and not by way of limitation, the processor 124 may include one or more instruction caches, one or more data caches, and one or more translation lookaside buffers (TLBs). Instructions in the instruction caches may be copies of instructions in the memory 126 or the storage device 127. In some embodiments, the processor 124 is operably coupled to send data to a computing device operatively coupled (e.g., over the Internet) to the controller 120, such as a server or personal computer.

The memory 126 may be used for storing data, metadata, and programs for execution by the processor(s). The memory 126 may include one or more of volatile and non-volatile memories, such as Random-Access Memory ("RAM"), Read-Only Memory ("ROM"), a solid-state disk ("SSD"), Flash, Phase-Change Memory ("PCM"), or other types of data storage. The memory 126 may be internal or distributed memory. In some embodiments, the memory 126 may store algorithms for operating the cooling system 122, detecting temperatures, etc., to be executed by the processor 124.

The storage device 127 includes storage for storing data or instructions. As an example and not by way of limitation, storage device 127 can comprise a non-transitory storage medium described above. The storage device 127 may include a hard disk drive (HDD), a floppy disk drive, flash memory, an optical disc, a magneto-optical disc, magnetic tape, a Universal Serial Bus (USB) drive or a combination of two or more of these. The storage device 127 may include removable or non-removable (or fixed) media, where appropriate. The storage device 127 may be internal or external to the controller 120. In one or more embodiments, the storage device 127 is non-volatile, solid-state memory. In other embodiments, the storage device 127 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The data acquisition system 128 may receive signals (e.g., temperatures) from the one or more temperature sensors 130 and may include, or have associated therewith, analog to digital conversion circuitry to convert analog signals from the temperature sensors 130 into digital numeric values that can be manipulated and/or analyzed by the controller 120 (e.g., the processor 124 and/or the data acquisition system 128). The data acquisition system 128 may further include one or more software programs developed using various general purpose programming languages such as Assembly, BASIC, C, C++, C#, Fortran, Java, LabVIEW, Lisp, Pascal, etc. As a non-limiting example, the controller 120 may include any data acquisition system known in the art.

The temperature sensors 130 may be connected to leads from the acquisition system and may be attachable to the support structure 102. The temperature sensors 130 may include any conventional temperature sensor. The data acquisition system 128 may receive signals from the temperature sensors 130 indicating a temperature of one or more portions of the support structure 102 and, based on determined temperatures of the support structure 102, the controller 120 may operate the cooling system 122.

The user interface 129 allows a user to provide input to, receive output from, and otherwise transfer data to and receive data from controller 120. The user interface 129 may include a mouse, a keypad or a keyboard, a touch screen, a camera, an optical scanner, network interface, modem, other known user devices or a combination of such user interfaces. The user interface 129 may include one or more devices for presenting output to a user, including, but not limited to, a graphics engine, a display (e.g., a display screen), one or more output drivers (e.g., display drivers), one or more audio speakers, and one or more audio drivers. In certain embodiments, the user interface 129 is configured to provide graphical data to a display for presentation to a user. The graphical data may be representative of one or more graphical user interfaces and/or any other graphical content as may serve a particular implementation.

The cooling system 122 may include a compressor 132, a condenser 134, an expansion valve 136, and an evaporator 138. The evaporator 138 may include the coils 110 within the thermally conductive insert 108 of the support structure 102. For example, the cooling system 122 may include any conventional refrigeration system and may be operated by the controller 120 and/or manually in conventional manners. In some embodiments, the coils 110 (i.e., the evaporator 138) may be removably coupled to a remainder of the cooling system 122. For example, the coils 110, and as a result, the support structure 102 may be relatively easily decoupled from the cooling system 122 and controller 120. Accordingly, different support structures having different sizes and shapes (e.g., contours) may be easily and quickly exchanged for a current support structure.

The cooling system 122 may further include a heat-transfer medium or a refrigerant. In some embodiments, cooling system 122 may include a heat-transfer medium of a water-glycol mixture (e.g., a water-glycol loop). In additional embodiments, the heat-transfer medium may include one or more of an oil, fresh water, salt water brine, alcohol, etc. In further embodiments, the cooling system 122 may include a refrigerant, and the refrigerant may include conventional refrigerants such as, for example, chlorofluorocarbons, hydrochlorofluorocarbons, hydrofluorocarbons (e.g., R32, R125, R134a, R245ca, R245fa, R404A, R407A, R410A, R507A, R508B, etc.), fluorocarbons, hydrocarbons, ammonia, R717, or any other conventional refrigerant.

Referring still to FIGS. 1 and 2, in some embodiments, the core support system 100 may optionally further include a fluid application system 140 for applying a fluid to the engagement layer 112 and the support structure 102. In some embodiments, the fluid application system 140 may include a reservoir 142 and an applicator 144. The applicator 144 may include any conventional spraying tool (e.g., a nozzle and pump, wand, etc.). In alternative embodiments, the applicator 144 may include a roller (e.g., a foam roller) that may apply the fluid to the engagement layer 112 by rolling a saturated roller over the engagement layer 112 (e.g., at least partially covering the engagement layer 112 with the fluid via the roller). In additional embodiments, the fluid application system 140 may include other systems for distributing fluids across a surface. For example, the fluid application system 140 may include a drip system, a flooding system, a sprinkler head, a spray bottle, etc. In some embodiments, the fluid application system 140 may be utilized to apply a freezable fluid. For instance, in some embodiments, the fluid may include one or more of water, water and salt mixtures, organic solvents, waxes, liquid gels, etc.

Figure 3:
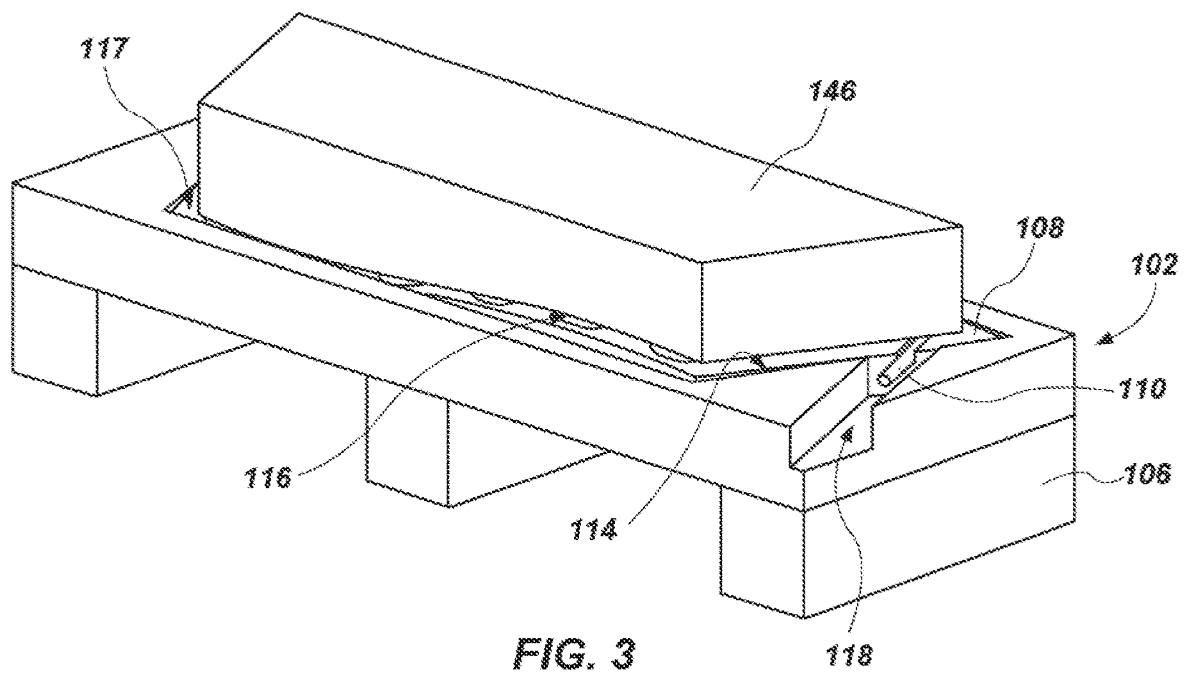
FIG. 3 is a perspective view of a core support structure of a core support system having a core material disposed thereon prior to a machining process according to one or more embodiments of the present disclosure.
Figure 4:
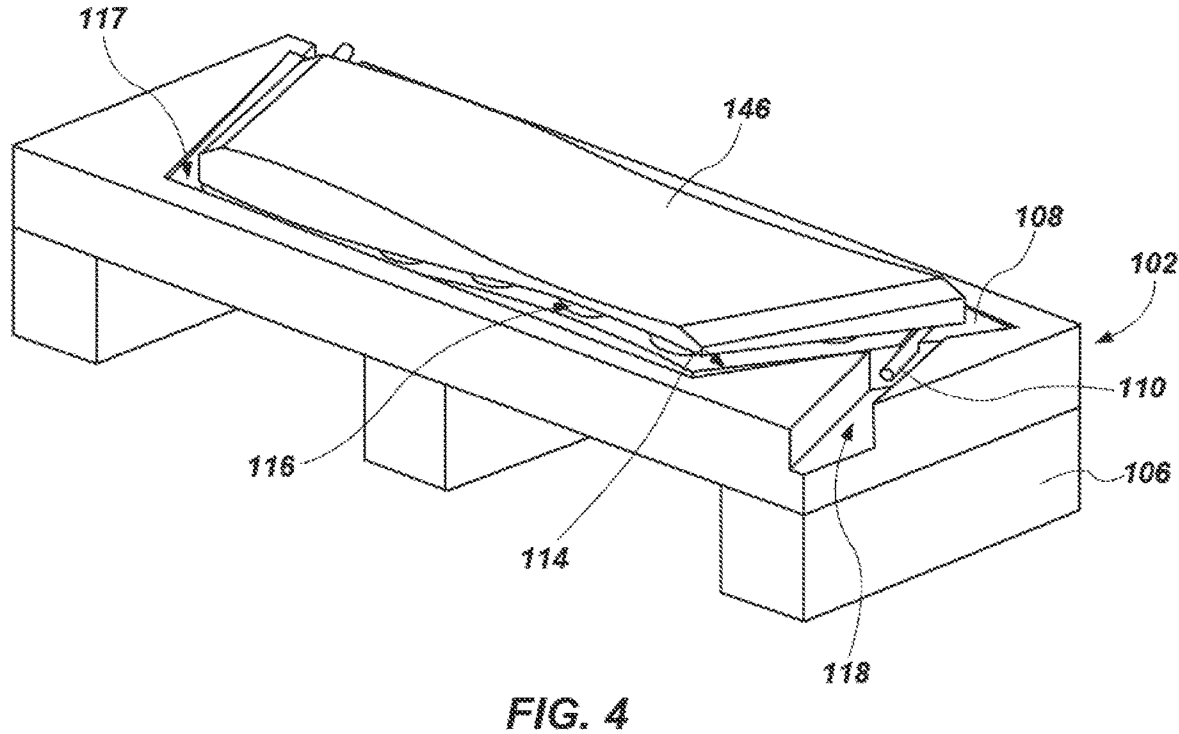
FIG. 4 is a perspective view of a core support structure of a core support system having a core material disposed thereon after a machining process according to one or more embodiments of the present disclosure.
Figure 7:
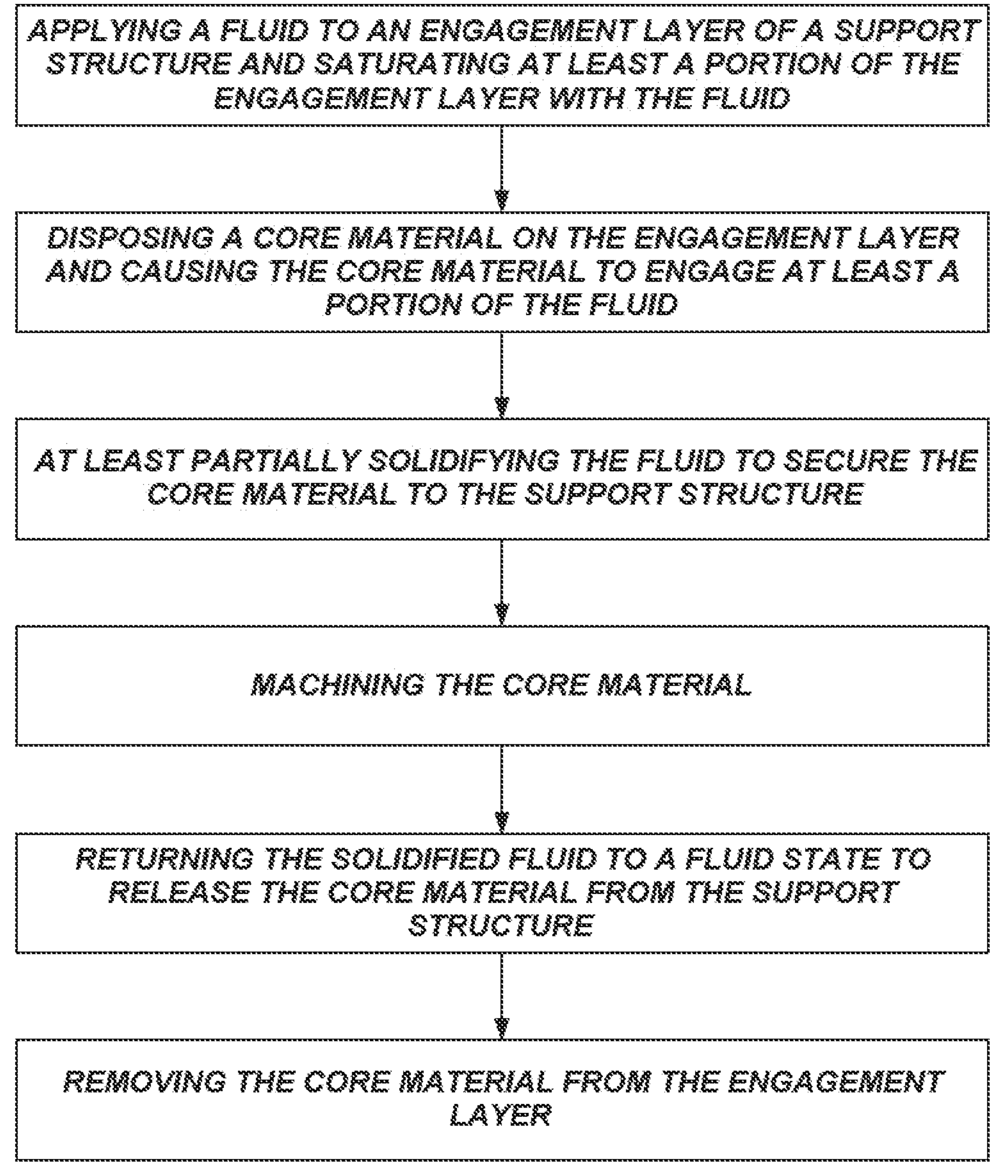
FIG. 7 depicts a flow chart of a method of machining a core material.

FIG. 3 is a perspective view of the support structure 102 of FIG. 1 with a core material 146 disposed on the thermally conductive insert 108 and prior to a machining procedure. The engagement layer 112 is removed to better show the internal structure of the support structure 102 and to facilitate description. FIG. 4 is a perspective view of the support structure 102 of FIG. 1 with the core material 146 disposed on the thermally conductive insert 108 and after a machining procedure. FIG. 7 depicts a flow chart of a method of machining a core material. Referring to FIGS. 1-4 and 7 together, in operation and when the core support system 100 is utilized to support a core material 146 during a machining process, a fluid (e.g., water) may be applied to the engagement layer 112 or the engagement layer 112 and the thermally conductive insert 108. In some embodiments, a sufficient amount of the fluid may be applied to at least substantially saturate at least a portion the engagement layer 112. Additionally, a sufficient amount of fluid may be applied to the engagement layer 112 to produce a film of the fluid having a thickness within a range of about 0.002 inch (2 mils) and about 0.150 inch (150 mils). For instance, in some embodiments, a sufficient amount of fluid may be applied to the engagement layer 112 to produce a film of the fluid having a thickness within a range of about 0.002 inch (2 mils) and about 0.010 inch (10 mils). As a non-limiting example, a sufficient amount of fluid may be applied to the engagement layer 112 to produce a film of the fluid having a thickness within a range of about 0.002 inch (2 mils) and about 0.003 inch (3 mils). For example, the film of fluid may have a thickness of about 0.0022 inch (2.2. mils). In some embodiments, the film of fluid may be formed on top of the engagement layer 112. For example, a thickness of the film of fluid may not include the engagement layer 112. In additional embodiments, the film of fluid may extend into and in some instances through (e.g., within) the engagement layer 112. For instance, a thickness of the film of fluid may include the engagement layer 112.

In some embodiments, the fluid may be continuously applied to the engagement layer 112 or the engagement layer

112 and the thermally conductive insert 108. For example, the engagement layer 112 or the engagement layer 112 and the thermally conductive insert 108 may be continuously wetted. In additional embodiments, the fluid may be applied via one or more discrete applications.

As will be appreciated by one of ordinary skill in the art, saturating at least portion the engagement layer 112 with the fluid may help to insure that the fluid is present on high areas (e.g., raised areas) of a contour of the thermally conductive insert 108 in at least the portion of the engagement layer 112 correlating to the high areas. For instance, if the thermally conductive insert 108 is non-planar, and the upper surface 117 of the thermally conductive insert 108 includes raised portions relative to other portions of the upper surface 117, saturating at least the correlating portion of the engagement layer 112 with the fluid may insure that the fluid is better retained (e.g., retained due to surface tension, adhesive tendencies, and cohesive tendencies of the fluid) at the raised portions relative to a thermally conductive insert not having an engagement layer disposed thereon. Additionally, the engagement layer 112 may help avoid pooling of the fluid at low areas of the contour of the thermally conductive insert 108. As a result, the engagement layer 112 may help to provide a more uniform film of fluid across the upper surface 117 of the thermally conductive insert 108.

Upon applying the fluid to the engagement layer 112 and the thermally conductive insert 108, the core material 146 may be placed on the engagement layer 112 and on the film of fluid. In particular, the core material 146 may be placed on the engagement layer 112 such that a side of the core material 146 that is to be machined faces away from the support structure 102. Furthermore, the core material 146 may be placed on the engagement layer 112 such that a side of the core material 146 engages the fluid. As used herein, the term "engage" when used in reference to the core material 146 and the fluid indicates that at least adjacent edges of the core material 146 are in contact with the fluid and at least a portion of the core material 146 may be surrounded by (e.g., immersed in) the fluid. For instance, a portion of the core material 146 having any of the thicknesses described above in regard to the film of fluid (e.g., a thickness of 2.2. mils) may be surrounded by the fluid.

After placing the core material 146 on the engagement layer 112 and in the film of fluid, the fluid may be solidified (e.g., frozen). In particular, freezing the fluid may include causing the control and cooling system 104 to provide a cooled refrigerant (via a conventional refrigeration processes) through the coils 110 (i.e., the evaporator 138) of the support structure 102 and cooling system 122. The cooled refrigerant may cause a temperature of the thermally conductive insert 108, the engagement layer 112, and the fluid to drop via conventional refrigeration processes. In some embodiments, the fluid may be cooled to a few degrees Celsius (2°-7°) below the freezing point of the fluid (e.g., 0° C. when the fluid comprises water). In additional embodiments, the fluid may be frozen by applying a relatively cold substance to the fluid and engagement layer 112. For instance, freezing the fluid may include applying (e.g., spraying) liquid nitrogen over the fluid and engagement layer 112 to freeze the fluid. Furthermore, although a refrigeration cycle is described herein, the cooling system 122 can utilize any other conventional cooling processes (e.g., a water-glycol loop) to remove heat from the engagement layer 112 and fluid.

In some embodiments, during operation of the core support system 100 and prior to freezing the fluid, the fluid's temperature may be kept within a few degrees Celsius of the fluid's freezing point. For example, the control and cooling system 104 may be continuously monitoring fluid temperature at various locations and operate the refrigeration apparatus to keep the fluid's temperature within a few degrees Celsius of the fluid's freezing point. In some embodiments, the control and cooling system 104 may cool the support structure 102 based at least partially on temperatures of the support structure detected via the temperature sensors 130. Then, upon placing a core material 146 on the engagement layer 112, the fluid may be relatively quickly cooled to the fluid's freezing point. For example, keeping the fluid's temperature within a few degrees of the fluid's freezing point may allow the fluid to be frozen within a desired amount of time. For instance, keeping the fluid's temperature within a few degrees of the fluid's freezing point may allow the fluid to be frozen within less than twenty minutes, less than ten minutes, less than five minutes, less than three minutes, less than two minutes, or less than one minute. As a result, keeping the fluid's temperature within a few degrees of the fluid's freezing point may allow a core material 146 to be relatively quickly secured to the support structure 102, as is discussed in greater detail below.

Freezing the fluid may secure the core material 146 to the engagement layer 112, and as result, may secure the core material 146 to the support structure 102. For instance, the fluid may freeze around any portion of the core material 146 engaged by the fluid and may freeze throughout the engagement layer 112. As a result, the fluid may secure the core material 146 to the support structure 102 via mechanical interference between the frozen fluid and the core material 146 and engagement layer 112 and adhesive forces and cohesive forces exhibited by the fluid. Additionally, in some embodiments where the engagement layer 112 is not secured to the thermally conductive insert 108 via adhesive or other manners, freezing the fluid may secure the engagement layer 112 to the thermally conductive insert 108.

Upon securing the core material 146 to the support structure 102 via freezing the fluid, the core material 146 may be machined via conventional methods (e.g., manual and/or automated methods). For instance, the support structure 102 may be disposed within a CNC machine 152 while coupled or decoupled from the control and cooling system 104, and the core material 146 may be machined via conventional CNC machining processes (e.g., milling, engraving, laser cutting, machining via spindles, etc.). Furthermore, the core material 146 may be machined via any other conventional methods including and/or not including CNC machining.

After machining of the core material 146 is completed, the state of frozen fluid may be altered (e.g., via melting, sublimation) to its fluid (e.g., liquid) form. In some embodiments, melting the frozen fluid may include passively allowing the frozen fluid to melt by exposing it to ambient air. In additional embodiments, melting the frozen fluid may include passing a warming fluid (e.g., warm water) through the coils 110 of the support structure 102. In further embodiments, melting the frozen fluid may include exposing the frozen fluid to heated air via a torch or heat gun. In yet further embodiments, melting the frozen fluid may include applying additional unfrozen fluid to the frozen fluid. In some embodiments, the fluid may be unfrozen by heating only a few degrees above a freezing point of the fluid.

Upon returning the fluid to its liquid form, the core material 146 may be removed from the support structure 102. Furthermore, the core material 146 may be utilized via any manners known in the art to form composite structures.

In view of the foregoing, securing a core material 146 to the support structure 102 during machining processes via the methods described herein may provide advantages over conventional methods of securing core materials during machining processes. For example, securing a core material 146 to the support structure 102 during machining processes via the methods described herein may prevent a loss of adhesion during the machining process unlike conventional methods such as vacuum fixtures. Moreover, because the fluid is melted (e.g., thawed) prior to removing the core material 146 from the support structure 102, removing the core material 146 from the support structure 102 may not damage the core material 146, unlike removal where conventional methods of securing core materials such as pressure adhesives, thermoplastics, and cure-on products are employed. Moreover, the methods of securing a core material 146 during machining processes described herein may avoid leaving residue on the core material 146 and/or contaminating the core material 146 with adhesives, thermoplastics, etc. Additionally, the methods of securing a core material 146 during machining processes described herein may be simplified in comparison to conventional methods by eliminating a separate cure cycle to bond a stabilizer material to the core material.

Referring still to FIGS. 1-4 together, in some embodiments, the core support system 100 may not include the cooling system 122 and coils 110. Rather, in one or more embodiments, the thermally conductive insert 108 of the core support system 100 may include a thermoelectric cooler (TEC), which uses the Peltier effect to create a heat flux between a junction between two different types of materials. For instance, the thermoelectric cooler may include a solid-state active heat pump that transfers heat from one side (e.g., an upper surface 117) of the thermally conductive insert 108 to an opposite side (e.g., lower surface) of the thermally conductive insert 108. For example, the core support system 100 may include any thermoelectric cooler known in the art. Utilizing a thermoelectric cooler may be advantageous over conventional refrigeration systems. For instance, thermoelectric coolers eliminate moving parts thus, reducing a frequency of required maintenance. Moreover, thermoelectric coolers remove any need for refrigerants, which can be toxic and/or harmful. Additionally, thermoelectric coolers can control temperatures within fractions of degree. Accordingly, the temperature of the upper surface 117 of the thermally conductive insert 108 may be quickly decreased and/or increased to secure and release the core material 146 relatively quickly.

Figure 5A:
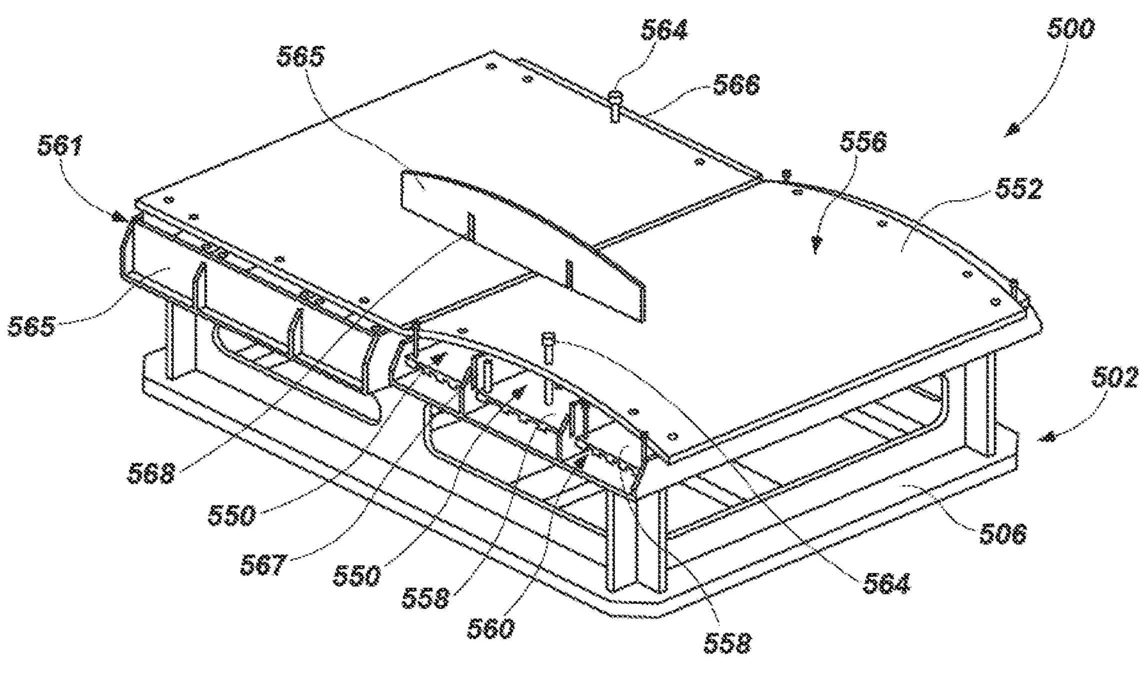
FIG. 5A a perspective view of a core support structure of a core support system according to one or more additional embodiments of the present disclosure.
Figure 5B:
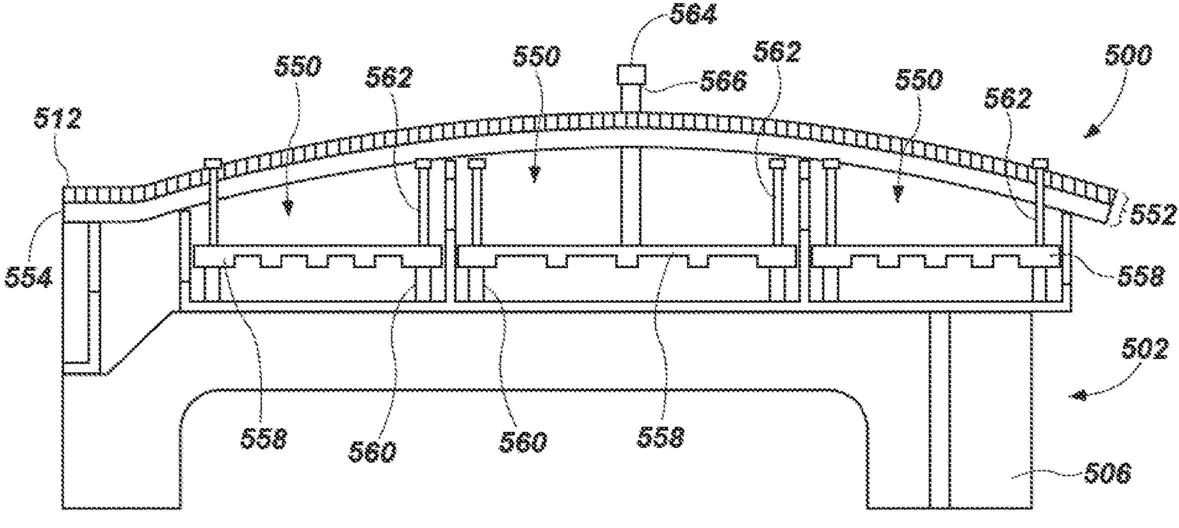
FIG. 5B is a partial side view of the core support structure of FIG. 5A.

FIG. 5A is a perspective view of a core support system 500 according to one or more additional embodiments of the present disclosure. FIG. 5B is a side view of the core support system 500 of FIG. 5A. Referring to FIGS. 5A and 5B, in some embodiments, the core support system 500 may include a support structure 502. The support structure 502 may include an insulating frame 506 at least partially defining one or more compartments 550 and a support member 552. The support member 552 may be disposed over the one or more compartments 550. For instance, the support member 552 may form an upper wall of the one or more compartments 550.

The support member 552 may include a support layer 554 (e.g., a support plate) and an engagement layer 512 disposed over the support layer 554. It is noted that the engagement layer 512 is removed in FIG. 5A to better show elements of the support structure 502. Furthermore, the engagement layer 512 may include any of the engagement layers described above in regard to FIGS. 1-4. In some embodiments, the support layer 554 may have an at least substantially planar upper surface 556. In additional embodiments, the upper surface 556 of the support layer 554 may include at least one non-planar portion (e.g., an arcuate portion). In further embodiments, the upper surface 556 of the support layer 554 may include at least one at least substantially planar portion and at least one non-planar portion. In one or more embodiments, the support layer 554 may include one or more metals, metal alloys, or plastics having a relatively high thermal conductivity. For instance, the support layer 554 may include one or more of copper, aluminum, brass, steel, stainless steel, bronze, etc.

Each compartment 550 of the one or more compartments 550 may include a plate 558, at least one biasing member 560, at least one guide member 562, and a control rod 564. The plate 558 may be disposed beneath the support layer 554 and may face the support layer 554. In some embodiments, the plate 558 may form a bottom wall of a respective compartment 550. The at least one guide member 562 may include a rod extending through an aperture in the plate 558 and may be oriented to enable the plate 558 to translate toward and away from the support layer 554 along the at least one guide member 562. For instance, the at least one guide member 562 may be sized and shaped to guide a movement of the plate 558 toward and away from a lower surface of the support layer 554. In alternative embodiments, the at least one guide member 562 may include a protrusion extending from a lateral side of the plate 558 that is received into a channel formed in the insulating frame 506 of the support structure 502.

In one or more embodiments, the at least one biasing member 560 may include a spring extending around an outer circumference of the at least one guide member 562. The at least one biasing member 560 may bias the plate 558 toward a lower surface of the support layer 554. In other words, the at least one biasing member 560 may push against a bottom surface of the plate 558 and may urge the plate 558 toward the lower surface of the support layer 554. As noted above, in some embodiments, the at least one biasing member 560 may include a spring. For example, the plate 558 and at least one biasing member 560 may form a spring-loaded plate assembly configured to push the plate 558 toward to the lower surface of the support layer 554.

In some embodiments, the control rod 564 may extend through an aperture in the support member 552 and may abut against an upper surface of the plate 558. In some embodiments, the control rod 564 may be connected (e.g., secured) to the upper surface of the plate 558. The control rod 564 may enable a user to control a distance between the lower surface of the support layer 554 and the upper surface of the plate 558. For instance, the control rod 564 may enable a user to control a size of each compartment 550 of the one or more compartments 550. Furthermore, in some embodiments, the control rod 564 may enable a user to release the plate 558 and at least one biasing member 560 to allow the at least one biasing member to move the plate 558 toward the support layer 554. In one or more embodiments, the control rod 564 may include a catch member 566 such that a respective compartment 550 can be locked into an open configuration (e.g., held at a maximum size) and unlocked to release the plate 558 and the at least one biasing member 560 allowing the at least one biasing member 560 to move the plate 558 toward the support layer 554. As is described in further detail below, a freezing substance (e.g., frozen carbon dioxide (i.e., dry ice)) or cold substance (referred to herein collectively as "freezing substance") may be disposed in the one or more compartments 550, and the plate 558 and at least one biasing member 560 may press the freezing substance up against the lower surface of the support layer 554 and thus, cause the fluid on and/or within the engagement layer 512 to freeze.

In one or more embodiments, the support structure 502 may further include one or more retainer assemblies 561 disposed at each longitudinal end of the one or more compartments 550 of the support structure 502. Each of the retainer assemblies 561 may include a side panel 565 (one shown in an exploded view for clarity) and a first plurality of vertical slots 567 defined in sidewalls of the one or more compartments 550. The side panel 565 may be sized and shaped to be at least partially inserted into the first plurality of vertical slots 567 of the sidewalls. In some embodiments, the side panel 565 may also include a second plurality of vertical slots 568 correlating to the first plurality of vertical slots 567 of the sidewalls, and the second plurality of vertical slots 568 may be sized and shaped to at least partially fit within the first plurality of vertical slots 567 of the sidewalls. When assembled within the support structure 502, the side panel 565 may extend in a vertical direction, may rest on a horizontal wall of the insulating frame 506, and may at least substantially prevent a freezing substance disposed within the one or more compartments 550 from escaping the one or more compartments 550. Additionally, an upper edge of the side panel 565 may at least substantially match a contour of upper surface 556 of the support layer 554, and a lower edge of the side panel 565 may at least substantially match a contour of an upper surface of the horizontal wall of the insulating frame 506 upon which the side panel 565 rests.

Referring still to FIGS. 5A and 5B, in operation of the core support system 500, a fluid may be applied to the engagement layer 512 via any of the methods described above in regard to FIGS. 1-4. For instance, the core support system 500 may include the fluid application system 140 described above in regard to FIG. 1. Additionally, a core material 146 (FIG. 3) may be disposed on the engagement layer 512 via any of the manners described above.

Moreover, a user may dispose (e.g., place) a freezing substance within the one or more compartments 550 when the one or more compartments 550 are in an open configuration (e.g., the plate 558 and at least one biasing member 560 are in a locked lower position). In some embodiments, the freezing substance may include one or more of frozen carbon dioxide (i.e., dry ice), liquid nitrogen, frozen water, etc. Upon disposing the freezing substance within the one or more compartments 550, the user may release the plate 558 and the at least one biasing member 560, and the plate 558 and the at least one biasing member 560 may press the freezing substance against the lower surface of the support layer 554.

Referring to FIGS. 5A and 5B together, pressing the freezing substance against the lower surface of the support layer 554 may reduce a temperature of the support layer 554 to a temperature below the freezing point of the fluid. Reducing a temperature of the support layer 554 to a temperature below the freezing point of the fluid may cause the fluid applied to the engagement layer 512 on the support layer 554 to freeze and, as a result, secure the core material 146 to the engagement layer 512 and the support structure 502. Upon securing the core material 146 to the support structure 502, the core material 146 may be machined via any of the manners described above. Furthermore, securing the core material 146 to the support structure 502 via the method described in regard to FIGS. 5A and 5B may provide any of the advantages described above in regard to FIGS. 1-4.

Figure 6A:
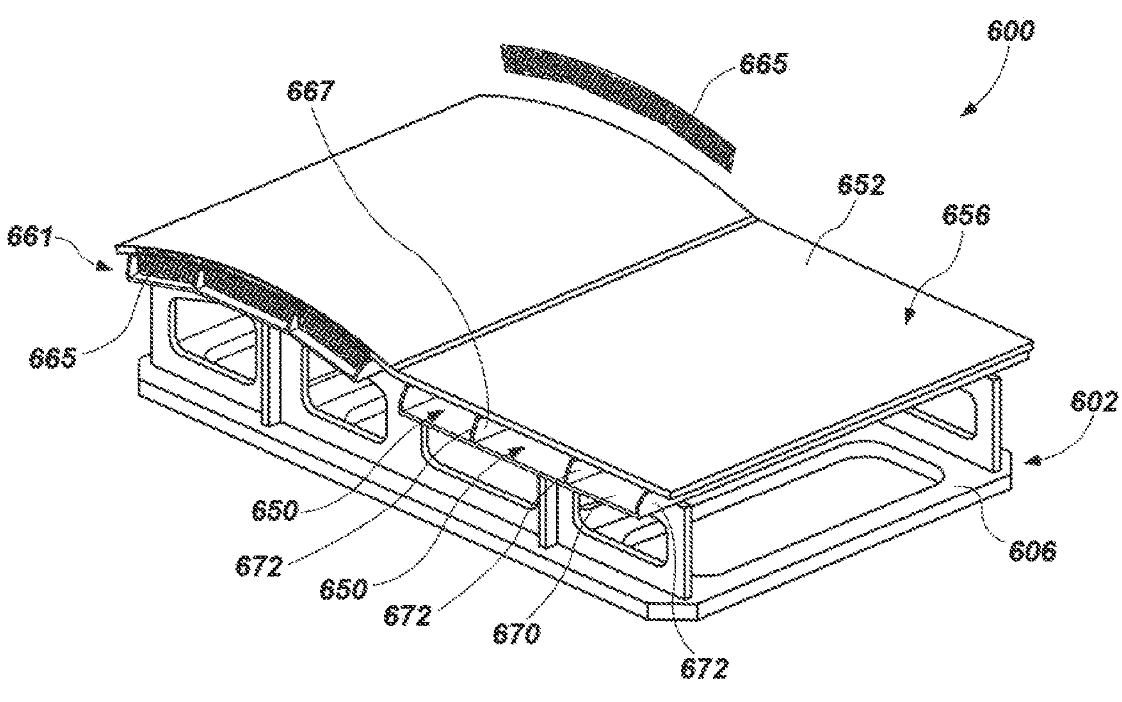
FIG. 6A a perspective view of a core support structure of a core support system according to one or more additional embodiments of the present disclosure.
Figure 6B:
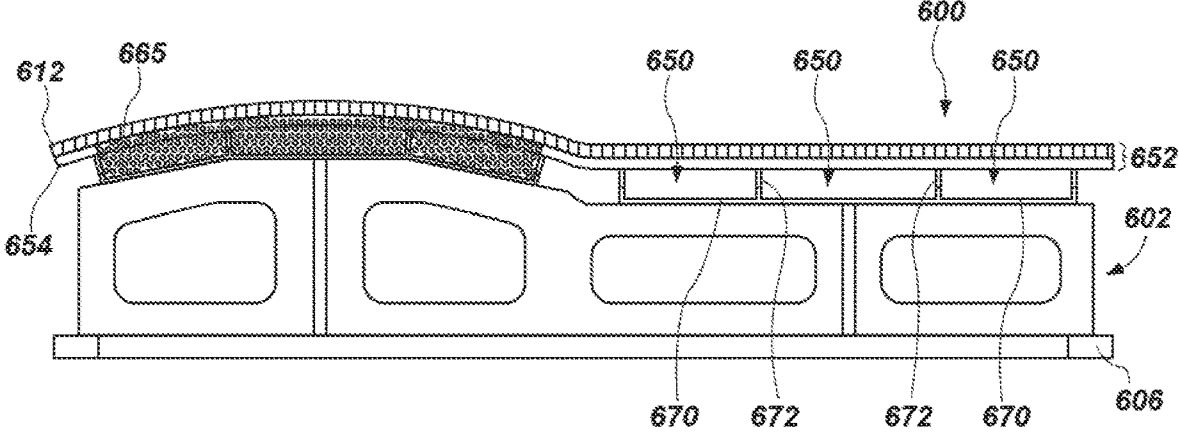
FIG. 6B is a side view of the core support structure of FIG. 6A.

FIG. 6A is a perspective view of a core support system 600 according to one or more additional embodiments of the present disclosure. FIG. 6B is a side view of the core support system 600 of FIG. 6A. Referring to FIGS. 6A and 6B, in some embodiments, the core support system 600 may include a support structure 602. The support structure 602 may include an insulating frame 606 at least partially defining one or more compartments 650 and a support member 652. The support member 652 may be disposed over the one or more compartments 650. For instance, the support member 652 may form an upper wall of the one or more compartments 650.

The support member 652 may include a support layer 654 and an engagement layer 612 disposed over the support layer 654. It is noted that the engagement layer 612 is removed in FIG. 6A to better show elements of the support structure 602. Furthermore, the engagement layer 612 may include any of the engagement layers described above in regard to FIGS. 1-4. In some embodiments, the support layer 654 may have an at least substantially planar upper surface 656. In additional embodiments, the upper surface 656 of the support layer 654 may include at least one non-planar portion (e.g., an arcuate portion). In further embodiments, the upper surface 656 of the support layer 654 may include at least one at least substantially planar portion and at least one non-planar portion. In one or more embodiments, the support layer 654 may include one or more metals, metal alloys, or plastics having a relatively high thermal conductivity. For instance, the support layer 654 may include one or more of copper, aluminum, brass, steel, stainless steel, bronze, etc.

Each compartment 650 of the one or more compartments 650 may include a base wall 670 and one or more vertical sidewalls 672. For example, each compartment 650 may include an elongated channel defined by the base wall 670 and the one or more vertical sidewalls 672. Furthermore, the channel may face a lower surface of the support layer 654. In some embodiments, the one or more compartments 650 may be at least substantially stationary. In alternative embodiments, the one or more compartments 650 may be movably coupled to the support layer 654 and may behave like drawers relative to the support layer 654. For example, the one or more compartments 650 may slide outward laterally relative to the support layer 654 to allow a freezing substance to be relatively easily disposed within the one or more compartments 650, and the one or more compartments 650 can be relatively easily slid underneath the support layer 654. As is discussed in greater detail below, in some embodiments, the one or more compartments 650 may be sufficiently filled within a freezing substance such that the freezing substance comes into contact with the lower surface of the support layer 654 and/or is disposed relatively close to the lower surface of the support layer 654 when the one or more compartments 650 are disposed beneath the support layer 654.

In one or more embodiments, the support structure 602 may further include one or more retainer assemblies 661 disposed at each longitudinal end of the one or more compartments 650 of the support structure 602. Each of the retainer assemblies 661 may include a side panel 665 and a first plurality of vertical slots 667 defined in sidewalls of the one or more compartments 650. The side panel 665 may be sized and shaped to be at least partially inserted into the first plurality of vertical slots 667 of the sidewalls. In some embodiments, the side panel 665 may also include a second plurality of vertical slots correlating to the first plurality of vertical slots 667 of the sidewalls, and the second plurality of vertical slots may be sized and shaped to at least partially fit within the first plurality of vertical slots 667 of the sidewalls. When assembled within the support structure 602, the side panel 665 may extend in a vertical direction, may rest on the base wall 670 of the one or more compartments 650, and may at least substantially prevent a freezing substance disposed within the one or more compartments 650 from escaping the one or more compartments 650. In one or more embodiments, the side panel 665 may include one or more of a mesh material (e.g., a screen) or a perforated member. Additionally, an upper edge of the side panel 665 may at least substantially match a contour of upper surface 656 of the support layer 654, and a lower edge of the side panel 665 may at least substantially match a contour of an upper surface of the base wall 670 of the one or more compartments 650.

Referring still to FIGS. 6A and 6B, in operation of the core support system 600, a fluid may be applied to the engagement layer 612 via any of the methods described above in regard to FIGS. 1-4. For instance, the core support system 600 may include the fluid application system 140 described above. Additionally, the core material 146 (FIG. 3) may be disposed on the engagement layer 612 via any of the manners described above.

Moreover, a user may dispose (e.g., place) a freezing substance within the one or more compartments 650. In some embodiments, the freezing substance may include any of the freezing substances described above in regard to FIGS. 5A and 5B. In some embodiments, the one or more compartments 650 may be sufficiently filled with the freezing substance such that the freezing substance comes into contact with or is disposed relatively close to the lower surface of the support layer 654. For example, the one or more compartments 650 may be sufficiently filled with the freezing substance such that the freezing substance is disposed between about 0.00 inch and about 0.250 inch from the lower surface of the support layer 654.

Referring to FIGS. 6A and 6B together, filling the compartments 650 with the freezing substance may reduce a temperature of the support layer 654 to a temperature below the freezing point of the fluid. Reducing a temperature of the support layer 654 to a temperature below the freezing point of the fluid may cause the fluid applied to the engagement layer 612 on the support layer 654 to freeze and, as a result, secure the core material 146 to the engagement layer 612 and the support structure 602. Upon securing the core material 146 to the support structure 602, the core material 146 may be machined via any of the manners described above. Furthermore, securing the core material 146 to the support structure 602 via the method described in regard to FIGS. 6A and 6B may provide any of the advantages described above in regard to FIGS. 1-4.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. A material support system, comprising a thermally conductive member defining a support portion for receiving at least one material on the support portion, the thermally conductive member disposed inside a recess of an insulating frame and having one or more coil recesses on an upper surface thereof, the one or more coil recesses configured to provide refrigerant fluid pathways, the support portion comprising an at least partially fluid-saturatable engagement layer disposed over the thermally conductive member, the at least partially fluid-saturatable engagement layer directly covering the one or more coil recesses, the thermally conductive member configured to remove heat energy from a fluid disposed on or within the at least partially fluid-saturatable engagement layer to reduce a temperature of the fluid to solidify the fluid and secure the at least one material to the support portion of the thermally conductive member.

2. The material support system of claim 1, wherein the support portion comprises a support layer, and wherein the at least partially fluid-saturatable engagement layer includes a flexible material configured to conform to contours of an upper surface of the support layer.

3. The material support system of claim 2, wherein at least a portion of the upper surface of the support layer comprises an arcuate surface.

4. The material support system of claim 1, further comprising at least one channel defined in the thermally conductive member, the at least one channel configured to hold a freezing substance, and wherein the thermally conductive member is configured to remove heat energy from the fluid with the freezing substance to reduce the temperature of the fluid received by the at least partially fluid-saturatable engagement layer.

5. The material support system of claim 4, wherein the insulating frame defines one or more compartments, each of the one or more compartments comprising a channel of the at least one channel.

6. The material support system of claim 5, wherein each of the one or more compartments comprises a spring-loaded plate assembly.

7. The material support system of claim 6, wherein the spring-loaded plate assembly of each compartment comprises:

a plate; and one or more biasing members oriented and configured to bias the plate toward a lower surface of the support portion.

8. The material support system of claim 7, wherein the spring-loaded plate assembly of each compartment further comprises:

one or more guide members extending through the plate and configured to guide movement of the plate in toward and away from the lower surface of the support portion; and a control rod extending through the support portion and abutting up against an upper surface of the plate of the spring-loaded plate assembly, the control rod configured to modify a distance between the support portion and the plate.

9. A material support system, comprising:

an insulating frame defining one or more compartments, wherein each of the one or more compartments provides at least one channel configured to hold a freezing substance, wherein each of the one or more compartments comprises a spring-loaded plate assembly; and a thermally conductive member disposed over the one or more compartments and defining a support portion for receiving at least one material on the support portion, the support portion comprising an at least partially fluid-saturatable engagement layer disposed over the thermally conductive member;

wherein the thermally conductive member is configured to remove heat energy from a fluid with the freezing substance to reduce a temperature of the fluid received by the at least partially fluid-saturatable engagement layer to solidify the fluid and secure the at least one material to the support portion of the thermally conductive member.

10. The material support system of claim 9, wherein the support portion comprises a support layer and an engagement layer comprising the at least partially fluid-saturatable engagement surface, and wherein the engagement layer includes a flexible material configured to conform to contours of an upper surface of the support layer.

11. The material support system of claim 10, wherein at least a portion of the upper surface of the support layer comprises an arcuate surface.

12. The material support system of claim 10, wherein the upper surface of the support layer comprises an arcuate surface and a planar surface.

13. The material support system of claim 9, wherein the spring-loaded plate assembly of each compartment comprises:

a plate; and one or more biasing members oriented and configured to bias the plate toward a lower surface of the support portion.

14. The material support system of claim 13, further comprising a retainer assembly disposed at longitudinal ends of each compartment of the one or more compartments.

15. The material support system of claim 14, wherein the retainer assembly comprises a mesh panel securable to a longitudinal end of a respective compartment of the one or more compartments.

16. The material support system of claim 9, wherein the thermally conductive member comprises a thermally conductive insert, and wherein the at least one channel comprises a plurality of apertures defining one or more patterns of fluid pathways for the freezing substance.

17. A method of machining a core material, the method comprising:

applying a fluid to an engagement layer of a support structure and saturating at least a portion of the engagement layer with the fluid, wherein the support structure comprises a thermally conductive member that is disposed inside a recess of an insulating frame and has one or more coil recesses on an upper surface thereof, the one or more coil recesses is configured to provide pathways of the fluid, and the engagement layer is disposed over the thermally conductive member and directly covers the one or more coil recesses;

disposing a core material on the engagement layer and causing the core material to engage at least a portion of the fluid;

at least partially solidifying the fluid to secure to core material to the support structure;

machining the core material;

returning the solidified fluid to a fluid state to release the core material from the support structure; and removing the core material from the engagement layer.

18. The method of claim 17, wherein the at least partially solidifying the fluid comprises disposing a freezing substance into one or more compartments beneath the engagement layer.

19. The method of claim 18, wherein the disposing the freezing substance into one or more compartments beneath the engagement layer comprises disposing frozen carbon dioxide into the one or more compartments beneath the engagement layer.

20. The method of claim 19, wherein the disposing the freezing substance into one or more compartments beneath the engagement layer comprises disposing liquid nitrogen into the one or more compartments beneath the engagement layer.

* * * * *